United States Patent [19]

Jönsson

[11] Patent Number: 4,467,251

[45] Date of Patent: Aug. 21, 1984

[54] OBJECT SENSING APPARATUS

[75] Inventor: Bert O. Jönsson, Vintrie, Sweden

[73] Assignee: Besam AB, Landskrona, Sweden

[21] Appl. No.: 347,793

[22] Filed: Feb. 11, 1982

Related U.S. Application Data

[63] Continuation-in-part of Ser. No. 155,008, May 30, 1980.

[30] Foreign Application Priority Data

May 31, 1979 [SE] Sweden .............................. 7904749

[51] Int. Cl.³ .............................................. G05B 5/00
[52] U.S. Cl. ................................................ 318/480
[58] Field of Search ............... 318/480, 450, 460, 467; 340/555, 356; 187/52 R; 250/221, 209; 49/25; 361/176, 177; 307/117

[56] References Cited

U.S. PATENT DOCUMENTS

| | | |
|---|---|---|
| 1,719,621 | 7/1929 | Pearne et al. . |
| 1,929,273 | 10/1933 | Crago . |
| 2,331,023 | 10/1943 | Gayring . |
| 2,341,546 | 2/1944 | Hagenbook . |
| 2,401,396 | 6/1946 | Wolfner . |
| 3,120,654 | 2/1964 | Lee . |
| 3,183,499 | 5/1965 | Cowen . |
| 3,278,754 | 10/1966 | Wallace . |
| 3,470,382 | 9/1969 | Tobey . |
| 3,644,917 | 2/1972 | Perlman . |
| 3,680,047 | 7/1972 | Perlman . |
| 3,704,396 | 1/1972 | Macdonald . |
| 3,719,938 | 3/1973 | Perlman . |
| 3,739,372 | 6/1973 | Schlisser et al. . |
| 3,742,222 | 6/1973 | Endl . |
| 3,746,863 | 7/1973 | Pronovost . |
| 3,805,061 | 4/1974 | De Missimy et al. . |
| 3,852,592 | 12/1974 | Scoville et al. . |
| 3,858,043 | 12/1974 | Sick et al. . |
| 3,875,403 | 4/1975 | Svensson . |
| 3,885,872 | 5/1975 | Howe et al. . |
| 3,889,118 | 6/1975 | Walker . |
| 3,911,344 | 10/1975 | Svensson . |
| 3,912,924 | 10/1975 | Barrett, Jr. . |
| 4,015,122 | 3/1977 | Rubinstein . |
| 4,029,176 | 6/1977 | Mills . |
| 4,068,222 | 1/1978 | Treviranus . |

FOREIGN PATENT DOCUMENTS 1271601 7/1968 Fed. Rep. of Germany .

Primary Examiner—Ulysses Weldon
Attorney, Agent, or Firm—Brumbaugh, Graves, Donohue & Raymond

[57] ABSTRACT

An object sensing apparatus includes a plurality of light emitting diodes for illuminating a region of space and a plurality of closely arranged light detectors for receiving light reflected from an object. The apparatus is particularly useful in connection with automatically operated doors.

4 Claims, 17 Drawing Figures

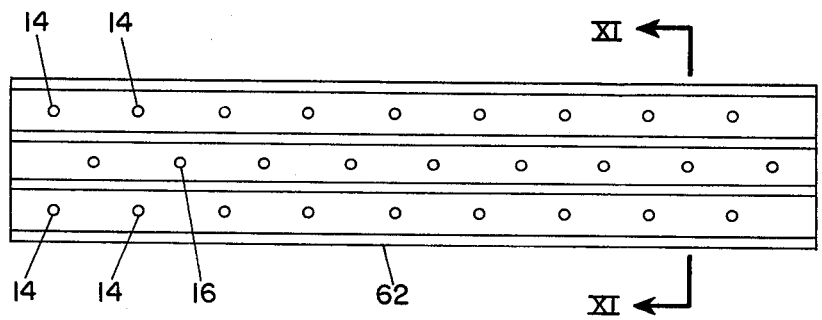
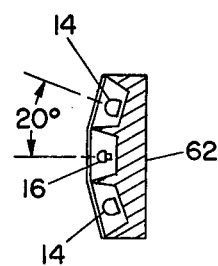
FIG. 10  FIG. 11
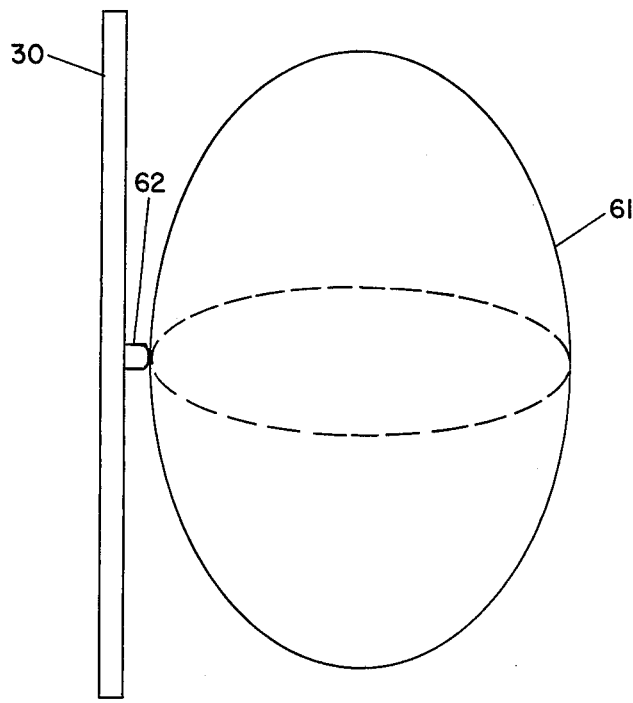
FIG. 12
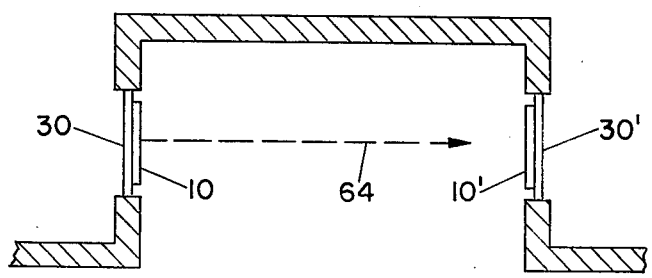
FIG. 13

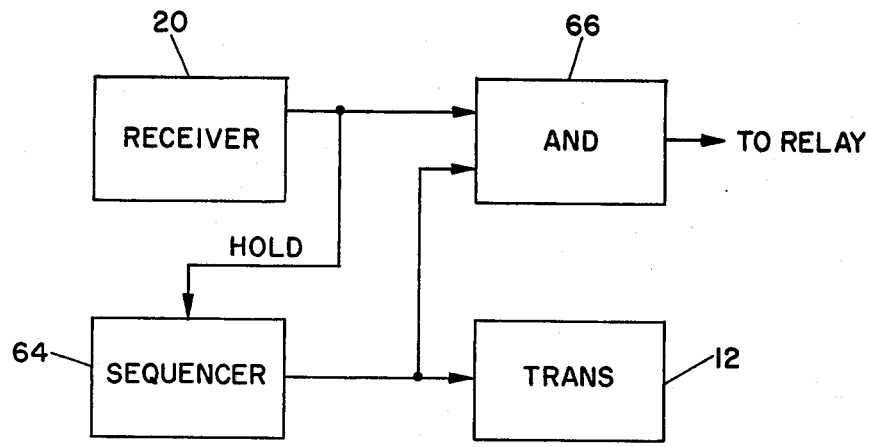
FIG. 14
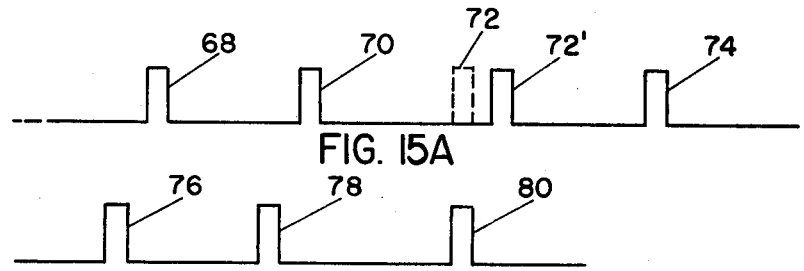
FIG. 15A
FIG. 15B
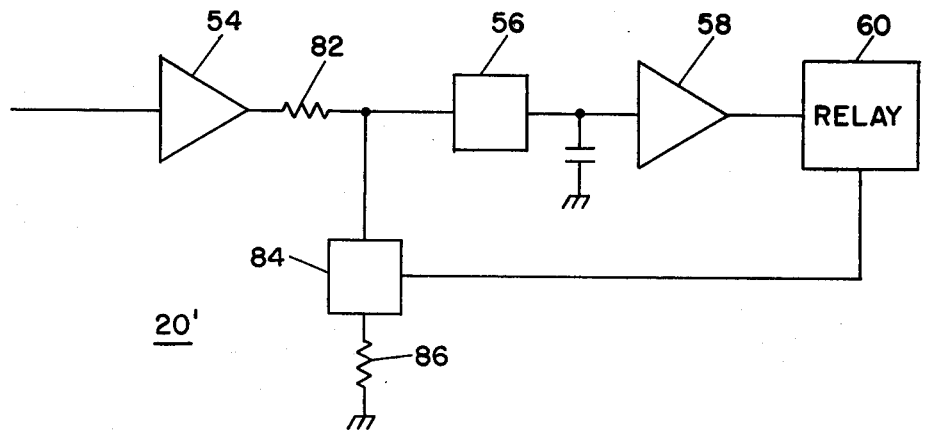
FIG. 16

OBJECT SENSING APPARATUS

BACKGROUND OF THE INVENTION

This application is a continuation-in-part of pending U.S. patent application Ser. No. 155,008, filed May 30, 1980.

The present invention relates to an appartus for sensing the presence of objects within a selected region of space. In particular the present invention relates to object sensing devices which are useful in connection with the operation of automatic doors or other automatically moving equipment.

In accordance with the prior art, it has been known to make use of light or radiation emitting equipment and radiation detecting equipment for the purpose of sensing the presence of an object or person in a particular region of space. One application for such object sensing equipment is in connection with the operation of an automatically operated door. In this case it is desirable to arrange the equipment to sense the approach of a person or an object, such as a shopping cart, from one direction of the door in order to activate the door to move it to the open position. It is likewise desirable to sense the presence of an object or person on the opposite side of the door to prevent the door from striking the person during the opening operation. Another sensing function is to determine when the person has passed through the doorway, and clear of the swing of the door, to enable closing of the door after the person has entered through the doorway.

The most reliable prior-art method for sensing the presence of a person is to provide pressure sensitive doormats which provide a signal in response to the weight of a person standing thereon. Such doormats must be provided on both sides of the door. On the approach side the doormat senses the presence of a person who wishes to pass through the doorway. On the inside of the door, in the area which includes the swing path of the door, the mat is provided to sense the presence of a person or object in the path of the door and provides a signal which prevents the door from opening and causing injury to the person or damage to the object thereon. The inside swing path doormat is also used to prevent closing of the door during the time when a person is passing through the doorway. After there is no weight on either of the doormats, the door is permitted to close.

The use of pressure sensitive doormats in connection with the operation of a swinging door in accordance with the prior art, while being the most reliable known method for detecting the presence of a person or object, has a disadvantage, which is normally associated with the use of a doormat installation on a high traffic floor. The doormats used to sense the presence of a person or object are subject to wear from the passage of traffic thereover. In addition, the doormats are usually in an outdoor entry location where they will be subjected to rainwater and to damage from ice, snow, and possibly salt or other corrosive chemicals used to clear ice and snow.

A further problem with the doormat sensing devices is the fact that it becomes difficult to tell when the device has failed. Failure of the swing path doormat can result in injury to a person and consequent liability to the owner or occupant of the premises in which the door has been installed.

There have also been provided object sensing devices wherein a radiation source is provided which sends radiation along a selected path toward a radiation sensing element. When an object or person enters the path of the radiation, the absence of the radiation being received at the sensing element provides an indication that there is an object or person in the path of the beam. The use of the beam-path type sensor provides a certain "fail safe" reliability because of the fact that a beam must pass completely through the path in order to be detected and provide an indication of a safe condition. It becomes necessary, however, in connection with the operation of a swinging door, to provide a great many emitters and detectors to provide adequate assurance that a small child is not within the path of the swinging door.

U.S. Pat. No. 3,852,592 to Scoville describes a prior art door opening control apparatus which includes an emitter mounted above the doorway which sends infrared radiation along a downwardly directed energy beam which spans a path of travel of pedestrian traffic approaching the doorway. There is provided a sensing element which is mounted on the jam of the doorway and which has a receiving beam pattern of sensitivity which is generally horizontally disposed, so that there is provided an intersection of the infrared radiation beam from the emitter and the horizontal sensing beam pattern from the receiver, which defines a protected area in space. The patent states that additional emitters may be provided, as requried, to provide additional protection in additional regions in space.

While the apparatus described by Scoville may be effective in ordinary circumstances for detecting objects which are in the region defined by the intersection of the two beams, problems may arise from the fact that the door swings into the region of intersection of the two beams, and the door may interfere with operation of the system. In addition, the system may be sensitive to its installation, since the emitter and the detector are located at different locations, and the operation of these devices is sensitive to their locations and to their environment. Further, the system may fail to detect small objects, for example an infant crawling below the horizontal beam.

It is therefore an object of the present invention to provide a new and improved object detecting apparatus.

It is a further object of the present invention to provide such an apparatus which has a single location for emitters and detectors.

It is a further object of the present invention to provide such an apparatus which is less sensitive to the environment of its installation, and is less sensitive to changes in the reflectivity of the object to be detected.

SUMMARY OF THE INVENTION

In accordance with the invention there is provided an apparatus for sensing objects which includes a plurality of radiation emitting elements each arranged to radiate a diverging beam of radiation into a selected region of space from a position on one side of the region of space. There is also provided a plurality of radiation sensing elements, arranged in proximity to the emitting elements for receiving radiation reflected from a radiation reflecting object within the region.

In a preferred arrangement the transmitting and receiving elements are arranged along separate straight lines which are separated by a small distance, for example, less than 16 mm. The transmitting and receiving elements are preferably arranged with equal spacing along respective straight lines and interspered with each other. The distance between adjacent transmitting and receiving elements is preferably less than 20 mm.

In another arrangement according to the invention there are provided first and second arrays of transmitting elements arranged on opposite sides of an array of receiving elements. The transmitting arrays radiate into overlapping regions of space, and the receiving array receives radiation from both regions.

In one embodiment the transmitting and receiving elements are arranged in adjoining channels having opaque U-shaped cross sections. The channels provide a limitation on the radiation and receiving angles of the emitters and receivers to limit their transmitted and received beams to a selected region of space within which it is desired to detect objects.

In accordance with the invention there is also provided a control apparatus for an automatic door which has a motor operated means for swinging the door open in a selected first direction path from a door frame in response to the approach of an object from a second direction, and for inhibiting operation of the motor operating means in response to the presence of an object in the first direction path of the door. The control apparatus includes first and second object sensing apparatus mounted on the door and facing respectively in the first and second directions from the door. The first and second sensing apparatus each consists of a plurality of transmitting elements for emitting a diverging beam of radiation in response to supplied electrical signals, and means for simultaneously supplying electrical signals to all of the elements in each sensing apparatus. Each sensing apparatus also includes a plurality of radiation detecting elements for receiving radiation reflected from an object, and a receiver connected to the detecting elements for providing an output signal representative of the presence of an object. The apparatus also includes a control circuit for (1) activating the motor means to open the door in response to an output signal from the second sensing apparatus, (2) activating the motor means to maintain the door in an open position in response to an output signal from the second sensing apparatus and (3) inhibiting operation of the motor means and preventing opening of the door in response to an output signal from the first sensing apparatus.

The control apparatus can be arranged so that the control circuit is not operative to inhibit opening of the door after the motor means is operated and the door is opened by a selected amount. This prevents the presence of a railing or a wall adjacent the door opening from preventing further opening of the door. There may also be provided a radiation emitting means arranged to direct radiation along a path to the detecting elements of the first sensing apparatus when the door is opened. The control means is then arranged to activate the emitting means after the door is opened by a selected amount, and the control means is arranged to inhibit operation of the motor means upon obstruction of the path between the emitting means and the detecting elements of the first sensing apparatus.

Another aspect of the invention is the provision of a receiver for an object detecting system for a door operator which provides reduced receiver sensitivity upon the initiation of door operation.

In accordance with another aspect of the invention, there is provided an object detecting system wherein a series of pulses of radiation are emitted and wherein radiation reflected from objects is detected during the emission, thereby to detect the presence of an object. The apparatus is an arrangement for preventing interference from radiation emitted by a similar system. The apparatus includes a transmitter sequencing means which periodically generates pulse signals to cause the system to radiate. The sequencing means is responsive to a control signal for inhibiting pulse generation. The apparatus further includes a receiver which provides an output signal indicating the detection of radiation. The output signal is supplied to the sequencing means as a control signal. Finally, the apparatus includes an output means which provides an object indicating signal only upon concurrance of the pulse signal and the output signal.

The sensing apparatus of the invention may also be used in connection with machine tools, automatic transport vehicles, elevator doors and similar equipment for preventing such equipment from striking an object or person.

For a better understanding of the present invention, together with other and further objects, reference is made to the folloiwng description, taken in conjunction with the accompanying drawings, and its scope will be pointed out in the appended claims.

BRIEF DESCRIPTION OF THE DRAWINGS

FIG. 10 is a front view of another sensor assembly in accordance with the invention.

FIG. 11 is a cross sectional view of the FIG. 10 sensor assembly.

FIG. 12 is a side view of a door having installed thereon the sensor assembly of FIG. 10 and illustrating the transmitting pattern of the sensor assembly.

FIG. 13 is a top view of a multiple door sensor installation.

FIG. 14 is a block diagram of an arrangement for preventing sensor assembly interference.

FIGS. 15A and 15B are graphs showing pulse sequences for the FIG. 14 arrangement.

FIG. 16 is a block and schematic diagram illustrating an arrangement for sensitivity reduction.

DESCRIPTION OF THE INVENTION

Figure 1:
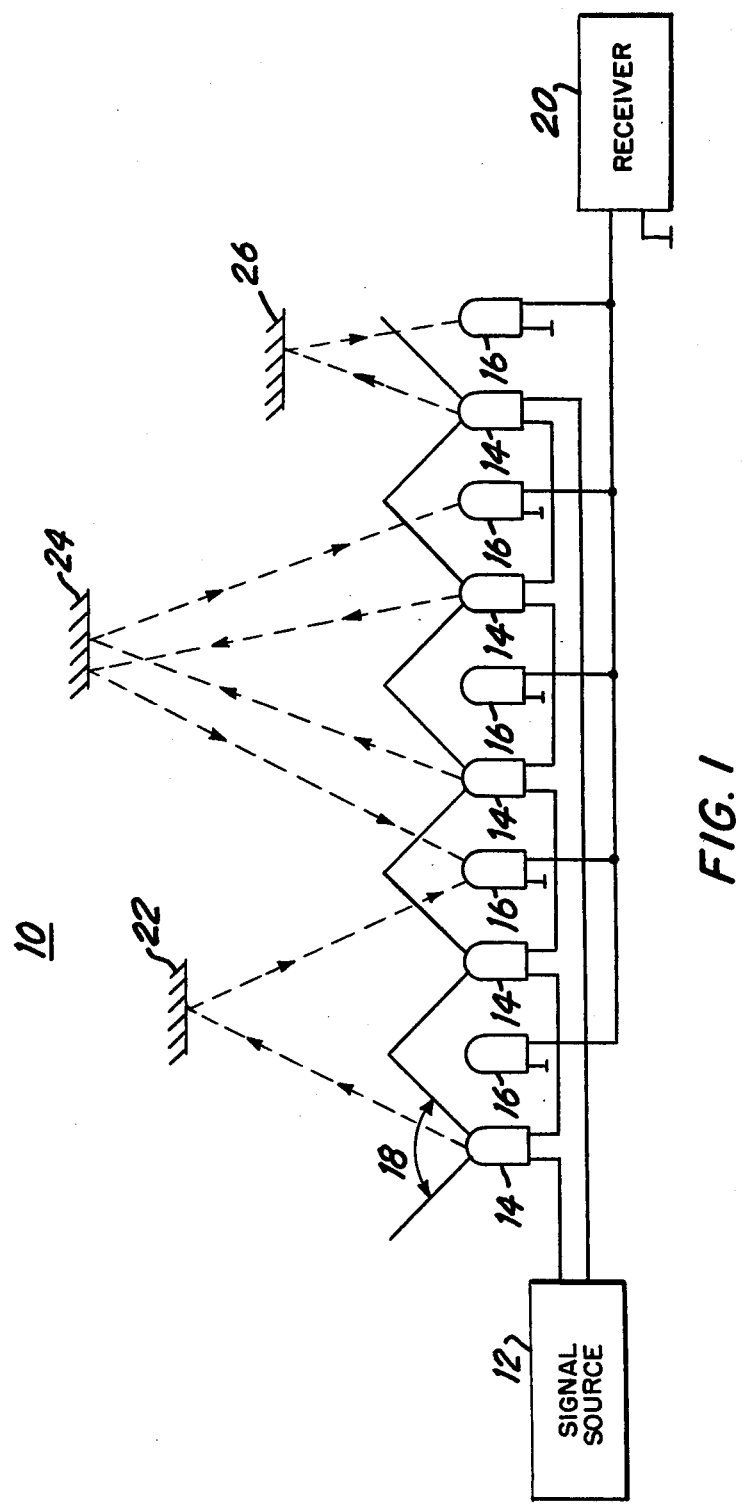
FIG. 1 illustrates the sensing apparatus of the present invention in schematic form.

In FIG. 1 there is shown a schematic diagram of the sensor assembly in accordance with the present invention. In the FIG. 1, diagram the sensor assembly 10 includes a source 12 for generating electrical signals, preferably pulse signals having a predetermined frequency such as a few kilohertz. The output of signal source 12 is provided to light-emitting diodes, which are connected in series with signal source 12. Those skilled in the art will recognize that it will also be possible to connect the light-emitting diodes 14 in parallel with the output of signal source 12, according to the voltage output of the signal source and the impedance of the diodes. Each of the light-emitting diodes 24 is arranged to radiate a diverging pattern of radiation. In the embodiment illustrated in FIG. 1 the light-emitting diodes 14 are each arranged to radiate in a conical pattern with an interior angle 18 which is approximately equal to 90°. Accordingly, objects 22, 24 and 26, which are within the radiation pattern of one or more of the light-emitting diodes 14 will receive radiation such as optical or infrared radiation, which is emitted from the diodes.

The sensor assembly 10 of FIG. 1 also includes a plurality of radiation detecting elements 16, such as photo-transistors. The photo-transistors 16 are arranged to have a diverging beam of radiation sensitivity, approximately the same shape as the beam of the light-emitting diodes 14. Accordingly, light or infrared radiation, emitted by light-emitting diodes 14, and reflected from an object 22, 24 or 26 within the region of space illuminated by the sensor assembly, will be reflected back into the light detecting elements 16 and generate therein an electrical signal. It should be noted that because of the diverging beams of radiation of the light-emitting diodes 14 and the diverging beam of sensitivity of the light-sensing elements 16, it will be possible for radiation, emitted by any of the diodes, to be reflected off an object in the object field and received by a plurality of the light-sensitive elements 16. This feature tends to increase the sensitivity of the sensing apparatus for relatively close objects, and thereby enables the easy detection of objects in the adjoining region of space, even if those objects have varying amounts of radiation reflectivity at the frequency of emission of the light sources 14.

The light sensing elements 16 are connected in parallel and their output signals are provided as in input to receiver 20. Receiver 20 preferably includes a tuned amplifier which is responsive to frequencies in the range of the output frequency of electrical signals from signal source 12.

The detecting apparatus of FIG. 1 is particularly useful in connection with automatically operated mechanical equipment for sensing the presence of an obstacle. In this respect, the sensing apparatus of FIG. 1 is preferred to the conventional reflection type object sensing apparatus by reason of the fact that it is less susceptible to variations in object detecting range with variation in radiation reflectivity of the object. Prior art reflection type object sensing apparatus makes use of a focused or collimated beam of light, which is directed outward in the direction from which an object is anticipated to approach. The radiation is reflected off the object and received by a sensing apparatus which also has a relatively-narrow, focused beam which is oriented in the identical direction. The range at which an object will be sensed by this type of apparatus will depend largely on the reflectivity of the object. An object such as a retro-reflecting device, which sends back a relatively focused beam of radiation toward the emitter will cause a very large response in the receiving device and may be detected at a very large range. An object of irregular shape which has relatively low reflectivity, such as a dull black overcoat, will not be detected until it is very close to the radiation detector.

Because the sensing apparatus illustrated in FIG. 1 uses a plurality of overlapping diverging light beams, forming diffuse light, rather than focused beams of radiation, for both the radiation emitting devices and the radiation detecting devices, it is susceptible to receiving and responding to radiation reflected off objects only within a limited range where multiple emitters illuminate the object with diffuse light and multiple receivers detect the reflected diffuse light. Therefore, the radiation detector is not likely to respond to an object at a relatively far distance, even if that object is highly reflective, since both the illumination of the object and the sensitivity of the detectors is greatly reduced with distance because of the diffuse nature of the illumination and detection as compared to focused beam illumination and detecting devices. In contrast, the sensing apparatus will respond relatively strongly to an object which is relatively close, because even though the reflection from the object may be diffused and scattered, it will be received by multiple detecting elements in the receiving array, and therefore, the output of these elements, as currents, will add in the receiver, and provide an adequate response to provide an output indication of the presence of the object.

Figure 2:
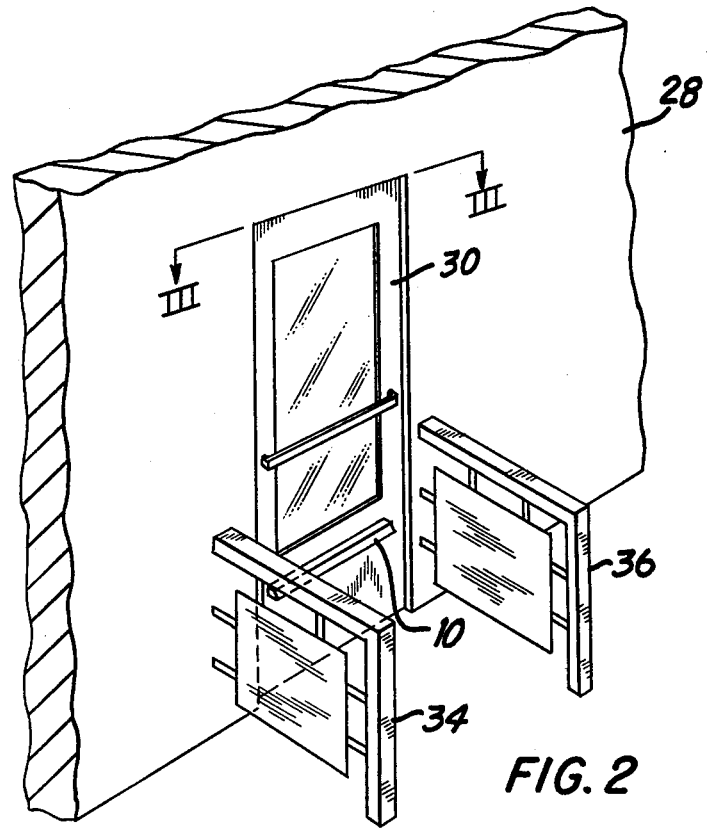
FIG. 2 illustrates the sensing apparatus of the present invention as installed on an automatic operating door.
Figure 3:
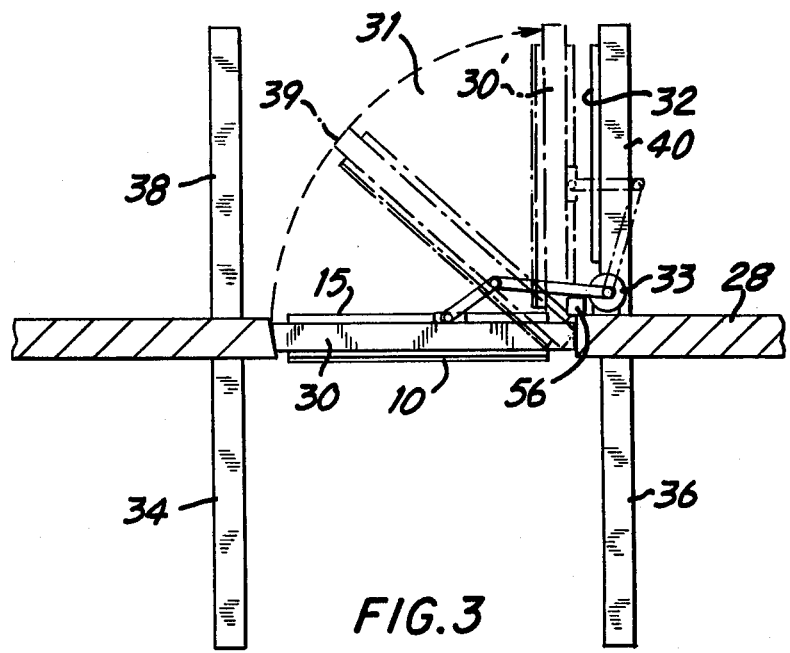
FIG. 3 is a top view of the door of FIG. 2.

FIG. 2 is a perspective view and FIG. 3 is a top, cross-sectional view of an automatically operated door 30 having a sensing apparatus 10 in accordance with the present invention. The door 30 is mounted within wall 28 and is opened and closed by means of a motor apparatus 33. On each side of the door there are provided guard rails 34, 36, 38 and 40, which are arranged to prevent approach toward the door from directions other than straight-on. The door of FIG. 2 is arranged to open in a first direction which is away from the side illustrated in FIG. 2, and along the path 31 to the position 30' which is illustrated in FIG. 3. Opening of the door 30 by motor 33 is effected in response to the detection of an object by sensing apparatus 10, which is mounted on the side of the door illustrated in FIG. 2 facing in a second direction with respect to the door. The door is provided with a second object sensing apparatus 15 which is mounted on the side of the door facing in the first direction corresponding to the door opening path. Sensing apparatus 15 is utilized by the door control apparatus to prevent opening of the door when there is an obstruction in the path of the door, such as a person standing next to the door. The sensing apparatus 15 inhibits the operation of the door when an object or person is sensed in its path in order to prevent damage to the door or injury to the person.

Figure 4:
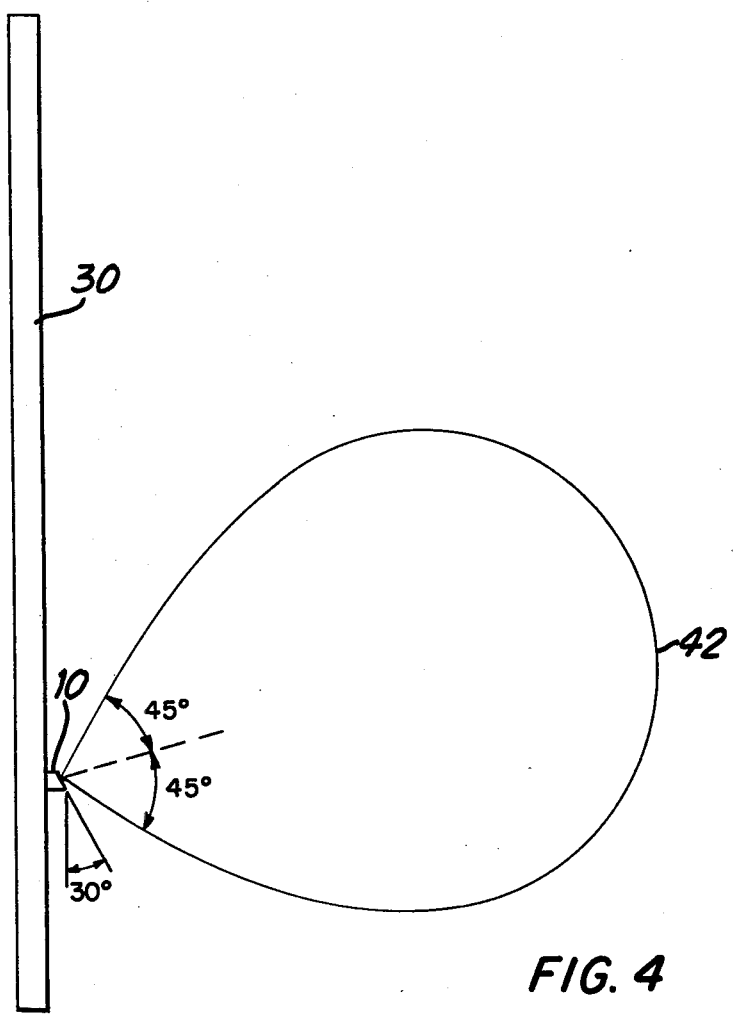
FIG. 4 is a side view of the door of FIG. 2 illustrating the radiation and receiving pattern of the sensor assembly.
Figure 5:
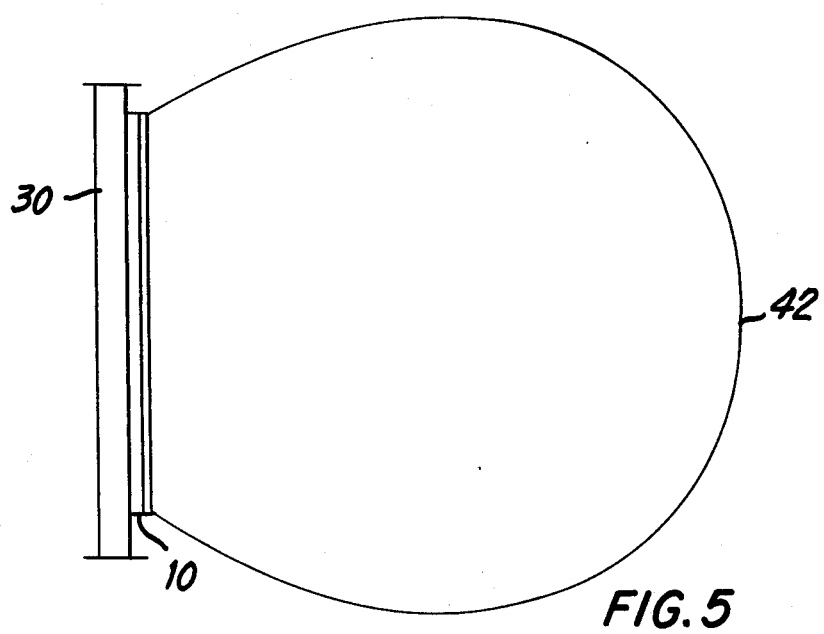
FIG. 5 is a top view of the FIG. 2 door illustrating the sensor assembly transmitting and receiving pattern.

The object sensing devices 10 and 15 which are mounted on the door 30 are illustrated schematically in FIG. 1. FIGS. 4 and 5 illustrate respectively the elevation and azimuth radiation transmitting and receiving beams for the sensing devices 10 and 15. The apparatus 10 has a radiation surface which is angled at approximately 30° from the vertical in order to orient the elevation radiation beam in a slightly upward from horizontal direction. The radiation beam has an approximately 90° half power beam width so that it radiates into an area 42 illustrated in elevation in FIG. 4 and in aximuth in FIG. 5. The device 10 is mounted approximately 15" above the floor on door 30 to detect objects near the bottom of the door.

Figures 6, 7:
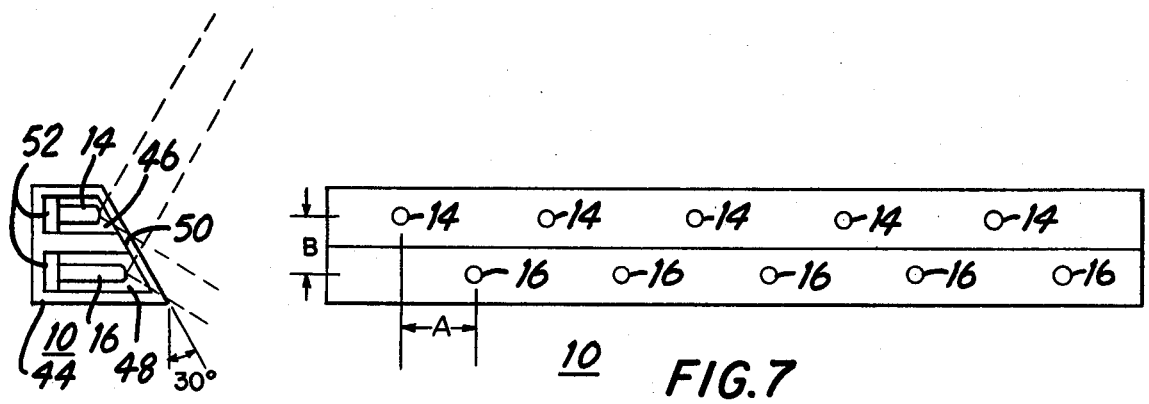
FIG. 6 is a cross-section view of a sensor assembly suitable for use in connection with the door of FIG. 2.
FIG. 7 is a front view of the sensor assembly of FIG. 6.

The radiation sensing apparatus 10 is illustrated in greater detail in FIGS. 6 and 7. The apparatus includes a pair of U-shaped channels 46, 48, made of opaque material, such as extruded aluminum. The channels have an outer surface which is cut off at the 30° angle illustrated in FIG. 4, and they are covered by a light transmitting cover 50, preferably have a tinting suitable to transmit and receive primarily radiation in the frequency band of operation of the light-emitting diodes 14. The light-emitting diodes 14 are contained in the upper channel 46. The photosensitive transistors 16 are contained in a lower channel 48. The location of the light-emitting diodes and photosensitive transistors in each of the channels is such as to provide the 90° radiation beam width which is illustrated in FIG. 4 and shown as dotted lines in FIG. 6. At the bottom of each of the channels 46 and 48 of the extruded member 44, there are provided circuits 52 for connecting the light emitting diodes and the photo transistors to the signal generating and receiving apparatus.

In the front plan view of FIG. 7, the spacing of the elements of the sensor assembly 10 is illustrated in greater detail. In the preferred embodiment illustrated, the light-emitting diodes 14 are arranged with approximately equal spacing along a first path which consists of a horizontal straight line down the center of the upper channel 46. The photo transistors 16 are arranged with similar equal spacing, interspersed with the diodes 14, along another straight path, which consists of the center line of the lower channel 48. The spacing between adjacent photo transistors and light-emitting diodes, designated spacing A in FIG. 7, is preferably selected to be approximately 20 millimeters or less. The spacing B between the paths on which are located the light-emitting diodes 14 and the photo transistors 16 is preferably no more than 16 millimeters. Spacings A and B which are greater than the recommended amounts have been found to make it difficult to obtain a response from small objects, such as sticks the size of fingers, within the region of space 42 illustrared in FIGS. 4 and 5. With the suggested spacing the device 10 will sense small objects out to a distance of approximately 5 to 8 feet. Naturally the range of the sensing apparatus can be adjusted according to the intensity of the diodes 14 and the sensitivity of the detectors 16 and the receiver.

Figure 8:
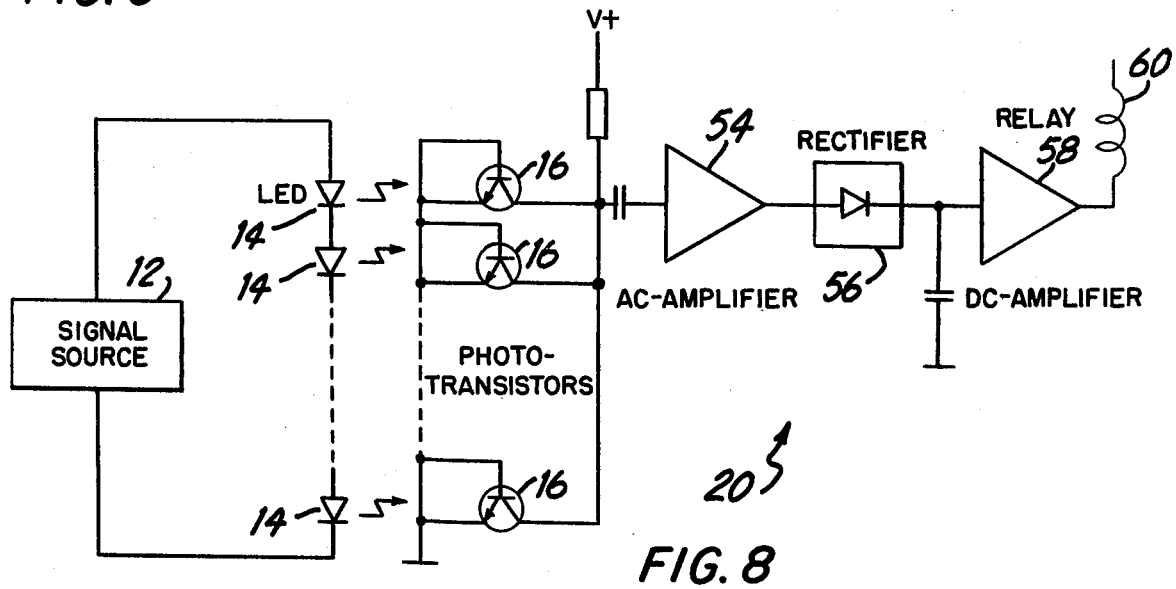
FIG. 8 is a schematic diagram of the FIG. 6 sensor assembly.
Figure 9:
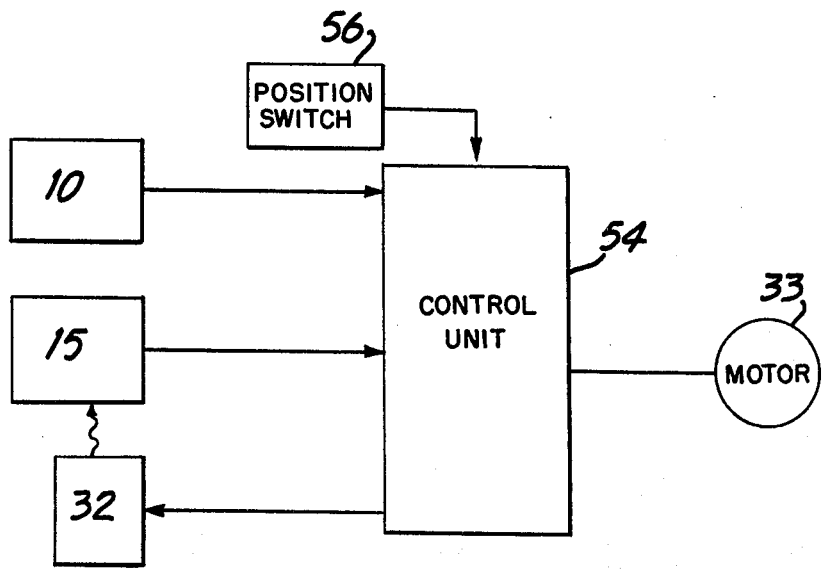
FIG. 9 is a block diagram illustrating the arrangement of the control apparatus usable for operating the door of FIG. 2.

FIG. 8 is a circuit diagram illustrating the circuits for the sensing apparatus 10. As illustrated in FIG. 8 the light-emitting diodes are connected in series to a signal source 12, and optically coupled to the photo transistors by means of reflection off an object. Photo transistors 16 are connected in parallel to drive a tuned amplifier 54 in the reciever 22. The output of the tuned amplifier is detected by a rectifier 56 and provided to a DC amplifier 58 which can operate a relay or other decision logic used in connection with the operation of the door. FIG. 9 illustrates a block diagram of the control apparatus usable in connection with the door 30 of FIG. 2. The control unit, which may be a programmed microprocessor or equivalent logic circuits, is connected to sensing apparatus 10, sensing apparatus 15 and also in a preferred embodiment there may be provided an additional light source 32 which is arranged on barrier 40 as illustrated in FIG. 3. The output of the control unit is connected to motor 33 and is arranged to operate the motor to open and close the door 30.

The control circuit illustrated in FIG. 6 under normal conditions operates to open the door in response to an object detecting signal emitted by detecting apparatus 10. Detecting apparatus 15 operates to inhibit activiation of door opening when an object obstructs the door. Accordingly control unit 54 will not open the door when a signal is received from unit 15, even if a signal is received from unit 10.

It will be recognized that as door 30 opens control unit 15 will respond to the prescence of barrier 40 in the path of the door and provide an output indication to control unit 54 indicating that an object is in the path of the door. This, under ordinary circumstances, would stop the further opening of the door. In order to prevent this false detection, the sensing unit 15 is inhibited by a signal from position switch 56 which indicates that the door has opened to a certain selected angle, for example, position 39. Signals received from detecting apparatus 15 indicating the presence of an object in the path of the door are no longer operative to prevent the control unit from effecting the continued opening of the door after switch 56 is activated. Such inactivation of the operation of sensing apparatus 15 may cause a hazardous condition because of the fact that, after the control unit is inhibited, a child can enter the path of the door and be injured by the door. In order to provide further safety under this circumstance, barrier 40 may be provided with light-emitting means 32 which emits light in the direction of sensing apparatus 15 after the position switch 56 is activated by opening of the door to position 39. Thereafter light passes directly from unit 32 to detecting apparatus 15, and causes an output signal from apparatus 15. At this point the output signal from apparatus 15 is considered to be a positive signal, and the further opening of the door will be inhibited only upon the interruption of the light path between unit 32 and detecting apparatus 15.

FIG. 10 shows an alternative arrangement for the transmitting and receiving elements. The FIG. 10 sensor assembly 62 includes two linear arrays of transmitting elements 14, such as light emitting diodes, which are arranged along straight lines on opposite sides of an array of receiving elements 16. As illustrated in the cross-sectional view of FIG. 11, the transmitting and receiving arrays are located in channels formed in the structural housing of the sensor assembly. The upper and lower transmitting channels containing elements 14 are inclined at an angle of approximately 20° above and below the beam direction of the receiving elements 16. This arrangement for the transmitting elements provides better object illumination when used in connection with a door, as illustrated in FIG. 12. The sensor assembly 62 is shown in FIG. 12 mounted near the vertical center of a door 30 and having a composite radiation pattern 61 formed by the overlapping radiation from the upper and lower transmitting arrays of sensor assembly 62.

Those skilled in the art will recognize that it is likewise possible to achieve better radiation pattern coverage as illustrated in FIG. 12 by using upper and lower inclined receiving arrays and a central transmitting element array.

FIG. 13 illustrates an installation wherein object detectors 10 and 10' of the type shown in FIG. 7 are mounted on doors 30 and 30', which face each other across a common entrance. As indicated by dotted arrow 64, it becomes possible in this type of installation to have one sensor assembly emit radiation which is received by the other sensor assembly, either directly or through reflection. This transmission from one sensor to the other can cause interference in the normal operation of the systems.

FIG. 14 is a block diagram of an arrangement whereby such interference can be avoided. The system shown in FIG. 14 is incorporated into the operational electronics of each of the sensors shown in FIG. 13 and operates independently so that the sensors need not be connected together or otherwise coordinated in operation.

Each sensor assembly is provided with a sequencer 4 which provided periodic pulses to the sensor transmitter 2 thereby causing the transmitter to emit a pulse of modulated radation, such as amplitude modulated infrared radiation. The pulses from sensor 64 are repeated at a regular, selected time interval.

Sequencer 64 is responsive to a control signal, provided to the hold input, which causes a delay in the output of a transmitter keying pulse for the duration of the control signal. The output of the sensor receiver 28 is connected to the sequencer as a control signal. Thus, if a sequencer is providing a sequence of pulses as shown in FIG. 15A, having pulses 68, 70, etc., and the sensor assembly is within visible range of another sensor assembly having the pulse sequence shown in FIG. 15B, with pulse 76, 78, 80, there comes a time when pulse 72 in FIG. 15A would have interference from pulse 80 in FIG. 15B. According to the arragnement of FIG. 14, pulse 80 is received by receiver 20 and provides a hold control signal to sequencer 64 which delays the initiation of pulse 72 to the position 72' so that there is no interference of pulses 72 and 80. Sequencer 64 then continues its usual pulse sequences as shown by pulse 74.

In order to prevent receiver interference the output of receiver 20 is combined with the sequencer output in an AND gate 66 for operation of the relay. Accordingly, for each sensor assembly, an object detection signal is provided only when a signal is received while the transmitter of that sensor assembly is operating. This prevents any interference between a pair of sensor assemblies.

Those skilled in the art will recognize that the sequencer 64 and gate 66 can be of conventional digital logic design. For example, the sequencer 64 can include a counter which provides periodic output pulses in response to a certain count signal derived from a clock. The hold signal can be used to gate the clock signal, and thereby delay a pulse when a signal is received by receiver 20.

FIG. 16 shows a further improvement in the present invention, which is useful for the sensor assemblies which are installed as door openers and the like. In connection with door opening, it is sometimes appropriate to reduce sensitivity of the sensor assemblies when the door is operating, for example, to prevent detection of a wall toward which the door is swinging. The circuit of FIG. 14 is a modification of the receiver 20 shown in FIG. 8 wherein a switch 84 is provided in connection with resistors 82 and 86, to provide reduced signal sensitivity when the door opening relay 60 is operative.

While the preferred emboidments of the invention have been described in connection with a motor operated swinging door, those skilled in the art will recognize that this and other embodiments will be useful in connection with sliding doors, elevator doors, self operated vehicles or other automatically moving devices.

While I have described what I believe to be the preferred embodiments of the invention, those skilled in the art will recognize that other and further changes and modifications may be made thereto, and it is intended to claim all such changes as fall within the true scope of the invention.

I claim:

1. Control apparatus for an automatic door having motor operated means for swinging said door open in a selected first direction path from a door frame in response to the approach of an object from a second direction, and for inhibiting operation of said motor operated means in response to the presence of an object in said first direction path of said door, comprising:
   a first object sensing apparatus, mounted on said door and facing said first direction;
   a second object sensing apparatus, mounted on said door and facing in said second direction;
   said first and second sensing apparatus each comprising a plurality of elements, each for emitting a diverging beam of diffuse radiation in response to supplied electrical signals, means for simultaneously supplying electrical signals to all of said elements, a plurality of radiation detecting elements for receiving radiation reflected from an object, and a receiver connected to said detecting elements for providing an output signal representative of the presence of an object;
   and a control circuit for:
   (1) activating said motor means to open said door in response to the output signal from said second sensing apparatus;
   (2) activating said motor means to maintain said door in an open position in response to the output signal from said second sensing apparatus, and
   (3) inhibiting operation of said motor means and preventing opening of said door in response to the output signal from said first sensing apparatus.

2. Apparatus as specified in claim 1 wherein said con circuit inhibiting operation is not operative after said motor means is operative and said door is opened by a selected amount.

3. Apparatus as specified in claims 1 or 2 wherein there is further provided radiation emitting means arranged to direct radiation along a path to said detecting elements of said first sensing apparatus when said door is opened, and wherein said control means is arranged to activate said emitting means after said door is opened by a selected amount and wherein said control means is arragned to inhibit operation of said motor means upon obstruction of said path between said emitting means and said detecting elements of said first sensing apparatus.

4. Apparatus as specified in claim 1 wherein at least one of said receivers includes means responsive to a supplied signal for reducing receiver sensitivity, and wherein said control circuit generates said supplied signal upon activation of said motor.

* * * * *

UNITED STATES PATENT AND TRADEMARK OFFICE
CERTIFICATE OF CORRECTION

PATENT NO. : 4,467,251

DATED : August 21, 1984

INVENTOR(S) : Bert O. Jonsson

It is certified that error appears in the above-identified patent and that said Letters Patent is hereby corrected as shown below:

```
Column 1, line 8, "appartus" should read --apparatus--;
Column 2, line 30, "requried" should read --required--;
Column 3, line 3, "interspered" should read --interspersed--,
Column 6, line 65, "aximuth" should read --azimuth--;
Column 7, line 40, "illustrared" should read --illustrated--;
Column 7, line 52, "reciever" should read --receiver--;
Column 8, lines 1 & 2, "activiation" should read
    --activation--;
Column 8, line 7, "precence" should read --presence--;
Column 9, line 10, "4" should read --64--;
Column 9, line 11, "provided" should read --provides--;
Column 9, line 12, "2" should read --12--;
Column 9, line 13, "radation" should read --radiation--;
Column 9, line 27, "arragnement" should read --arrangement--;
Column 10, line 43, "con" should read --control--;
Column 10, line 54, "arragned" should read --arranged--.
```

Signed and Sealed this

Seventeenth Day of September 1985

[SEAL]

Attest:

DONALD J. QUIGG

Attesting Officer

Commissioner of Patents and Trademarks—Designate